United States Patent
Singh et al.

(10) Patent No.: US 9,629,111 B2
(45) Date of Patent: Apr. 18, 2017

(54) SYSTEMS AND METHODS FOR VIRTUALLY SYNCHRONIZING UNSYNCHRONIZED OR LOOSELY SYNCHRONIZED NETWORKS FOR POSITION LOCATION DETERMINATION

(71) Applicants: Telcom Ventures, LLC, Miami, FL (US); NextNav, LLC, McLean, VA (US)

(72) Inventors: Rajendra Singh, Indian Creek Village, FL (US); George Ron Olexa, Gainesville, GA (US); Gary Parsons, Potomac, MD (US)

(73) Assignees: Telcom Ventures, LLC, Miami, FL (US); NextNav, LLC, McLean, VA (US)

( * ) Notice: Subject to any disclaimer, the term of this patent is extended or adjusted under 35 U.S.C. 154(b) by 79 days.

(21) Appl. No.: 14/198,258

(22) Filed: Mar. 5, 2014

(65) Prior Publication Data
US 2014/0254582 A1    Sep. 11, 2014

Related U.S. Application Data

(60) Provisional application No. 61/774,074, filed on Mar. 7, 2013.

(51) Int. Cl.
*H04W 64/00* (2009.01)
*H04W 56/00* (2009.01)
*G01S 5/02* (2010.01)

(52) U.S. Cl.
CPC ......... *H04W 56/0015* (2013.01); *G01S 5/021* (2013.01); *H04W 64/00* (2013.01); *H04W 56/0055* (2013.01)

(58) Field of Classification Search
None
See application file for complete search history.

(56) References Cited

U.S. PATENT DOCUMENTS

| 7,423,580 B2 | 9/2008 | Markhovsky et al. |
| 7,561,048 B2 | 7/2009 | Yushkov et al. |

(Continued)

FOREIGN PATENT DOCUMENTS

| EP | 1289331 A2 | 3/2003 |
| WO | WO 2012096608 A1 | 7/2012 |

OTHER PUBLICATIONS

Notification of Transmittal of the International Search Report and the Written Opinion of the International Searching Authority, or the Declaration, in corresponding PCT Application No. PCT/US2014/020653 mailed Jul. 7, 2014 (10 pages).

(Continued)

*Primary Examiner* — Chi H Pham
*Assistant Examiner* — Soon-Dong D Hyun
(74) *Attorney, Agent, or Firm* — Myers Bigel, P.A.

(57) ABSTRACT

Methods of operating a position network center, which includes at least one server, may include receiving timing-error data corresponding to a plurality of unsynchronized or loosely synchronized transmitters from at least one position network receiver. Moreover, the methods may include transmitting data indicating a plurality of timing errors by the plurality of unsynchronized or loosely synchronized transmitters to a wireless user device that receives signals from the plurality of unsynchronized or loosely synchronized transmitters. Related position network centers, position network receivers, and wireless user devices are also described.

22 Claims, 3 Drawing Sheets

(56) References Cited

U.S. PATENT DOCUMENTS

| | | |
|---|---|---|
| 7,760,132 B1 | 7/2010 | Markhovsky et al. |
| 7,787,886 B2 | 8/2010 | Markhovsky et al. |
| 7,822,424 B2 | 10/2010 | Markhovsky et al. |
| 7,872,583 B1 | 1/2011 | Yushkov et al. |
| 7,969,311 B2 | 6/2011 | Markhovsky et al. |
| 8,305,215 B2 | 11/2012 | Markhovsky et al. |
| 2003/0040323 A1* | 2/2003 | Pihl .................. H04W 64/00 455/456.1 |
| 2003/0069033 A1 | 4/2003 | Edge et al. |
| 2003/0122711 A1* | 7/2003 | Panasik et al. .............. 342/387 |
| 2005/0037786 A1 | 2/2005 | Edge |
| 2005/0136938 A1 | 6/2005 | Kang |
| 2006/0256001 A1 | 11/2006 | Markhovsky et al. |
| 2007/0075898 A1 | 4/2007 | Markhovsky et al. |
| 2007/0139200 A1 | 6/2007 | Yushkov et al. |
| 2008/0085699 A1 | 4/2008 | Hirano et al. |
| 2008/0123569 A1* | 5/2008 | Doss et al. ................... 370/280 |
| 2008/0285473 A1* | 11/2008 | Chen et al. .................. 370/252 |
| 2009/0168925 A1* | 7/2009 | Shirai ........................ 375/340 |
| 2011/0028166 A1* | 2/2011 | Ketchum et al. .......... 455/456.5 |
| 2011/0111751 A1 | 5/2011 | Markhovsky et al. |
| 2011/0143770 A1* | 6/2011 | Charbit et al. ............. 455/456.1 |
| 2011/0256882 A1 | 10/2011 | Markhovsky et al. |
| 2012/0329456 A1* | 12/2012 | Makh et al. ................ 455/435.1 |
| 2013/0045754 A1 | 2/2013 | Markhovsky et al. |
| 2013/0051312 A1 | 2/2013 | Smith et al. |
| 2013/0260798 A1* | 10/2013 | Moshfeghi .................. 455/456.5 |
| 2014/0099970 A1* | 4/2014 | Siomina et al. ........... 455/456.1 |
| 2015/0234051 A1* | 8/2015 | Moshfeghi .............. G01S 19/06 342/357.43 |

OTHER PUBLICATIONS

Written Opinion of the International Preliminary Examining Authority in corresponding PCT Application No. PCT/US2014/020653 mailed Feb. 26, 2015 (6 pages).

Notification Concerning Transmittal of International Preliminary Report on Patentability in corresponding PCT Application No. PCT/US2014/020653 mailed Jun. 23, 2015 (20 pages).

* cited by examiner

SYSTEMS AND METHODS FOR VIRTUALLY SYNCHRONIZING UNSYNCHRONIZED OR LOOSELY SYNCHRONIZED NETWORKS FOR POSITION LOCATION DETERMINATION

CLAIM OF PRIORITY

The present application claims the benefit of U.S. Provisional Patent Application Ser. No. 61/774,074, filed Mar. 7, 2013, entitled Systems and Methods for Virtually Synchronizing Unsynchronized or Loosely Synchronized Networks for Position Location Determination, the disclosure of which is hereby incorporated herein in its entirety by reference.

FIELD

The present disclosure relates to wireless communications systems and methods, and more particularly to location determination systems and methods.

BACKGROUND

In any given geographical area, there may be multiple wireless communications networks that can be used to determine the position location of a User Equipment (UE), if the networks are synchronized with respect to time. Achieving synchronization within a network or between different networks, however, may require a significant engineering burden. As the primary purpose of networks such as cellular, Wi-Fi, and broadcast networks is not to provide position location determinations, intra-system or inter-system synchronization is typically not done or is loosely done. For example, Wi-Fi or broadcast networks typically are not synchronized with respect to time. Moreover, some broadcast networks, such as single frequency networks (SFNs), may be loosely synchronized. Also, many cellular networks, such as some Long Term Evolution (LTE) networks, are loosely synchronized. As used herein, the term "loosely synchronized" means imprecisely (or partially) synchronized such that timing errors between different transmitters would result in imprecise position location determinations as compared to the precision of position location determinations that could be achieved if timing errors between different transmitters in the network were reduced.

Networks that are not synchronized with respect to time cannot be used for position location based on the time of signal arrival at a UE. Moreover, networks that are loosely synchronized, such as some LTE networks, may introduce significant errors in the determination of position location of the UE because of timing errors caused by imprecise synchronization between different transmitters in the networks.

SUMMARY

According to some embodiments, methods of operating a position network center including at least one server may be provided. The methods may include receiving, at the position network center, timing-error data corresponding to a plurality of unsynchronized or loosely synchronized transmitters, from at least one position network receiver. Moreover, the methods may include transmitting, from the position network center, data that indicates a plurality of timing errors by the plurality of unsynchronized or loosely synchronized transmitters, to a wireless user device that receives signals from the plurality of unsynchronized or loosely synchronized transmitters, after receiving the timing-error data from the at least one position network receiver at the position network center. Position network centers configured to perform the methods may also be provided.

In some embodiments, first and second ones of the plurality of unsynchronized or loosely synchronized transmitters may be associated with wireless networks operated by different service providers, respectively. Alternatively, first and second ones of the plurality of unsynchronized or loosely synchronized transmitters may be associated with different sites in a wireless network operated by a single service provider. Moreover, the at least one position network receiver may be synchronized with other position network receivers. Some embodiments may include performing a frame adjustment in response to determining that the signals from the plurality of unsynchronized or loosely synchronized transmitters do not belong to a same frame.

In some embodiments, the timing-error data may indicate the plurality of timing errors, by the plurality of unsynchronized or loosely synchronized transmitters. Alternatively, the timing-error data may include unprocessed signals that were transmitted, by the plurality of unsynchronized or loosely synchronized transmitters, with the plurality of timing errors, and the methods of operating the position network center may include calculating/determining the plurality of timing errors using the unprocessed signals and then transmitting the timing errors to the wireless user device. Moreover, calculating the plurality of timing errors may include calculating the plurality of timing errors at the position network center irrespective of precise locations of the plurality of unsynchronized or loosely synchronized transmitters.

According to some embodiments, methods of operating a position network receiver may include receiving signals from a plurality of unsynchronized or loosely synchronized transmitters. The methods may include calculating timing errors corresponding to the plurality of unsynchronized or loosely synchronized transmitters. Moreover, the methods may include transmitting timing-error data that indicates the timing errors, to a position network center including at least one server. Position network receivers configured to perform the methods may also be provided.

In some embodiments, the signals received from the plurality of unsynchronized or loosely synchronized transmitters may include signals that are transmitted by the plurality of unsynchronized or loosely synchronized transmitters to a wireless user device. Transmitting the timing-error data may include transmitting the timing-error data to the position network center for compensation of the timing errors, to assist with position location determination of the wireless user device. Moreover, receiving the signals may include continually or periodically receiving, from the plurality of unsynchronized or loosely synchronized transmitters, signals that are transmitted by the plurality of unsynchronized or loosely synchronized transmitters to the wireless user device.

According to some embodiments, methods of operating a wireless user device may include receiving a signal from an unsynchronized or loosely synchronized transmitter. The methods may include receiving timing-error data corresponding to the unsynchronized or loosely synchronized transmitter, from a position network center including at least one server. Moreover, the methods may include determining a position location of the wireless user device, using the timing-error data corresponding to the unsynchronized or loosely synchronized transmitter. Wireless user devices configured to perform the methods may also be provided.

In some embodiments, the methods of operating the wireless user device may include receiving a signal from at least one synchronized transmitter, and determining the position location of the wireless user device may include determining the position location of the wireless user device, using the timing-error data corresponding to the unsynchronized or loosely synchronized transmitter and using the signal from the at least one synchronized transmitter. The at least one synchronized transmitter may be at least one beacon of a terrestrial beacon network.

In some embodiments, receiving the signal from the unsynchronized or loosely synchronized transmitter may include receiving a first signal from a first unsynchronized or loosely synchronized transmitter, and the methods of operating the wireless user device may include receiving second and third signals from second and third unsynchronized or loosely synchronized transmitters, respectively. Receiving the second and third signals may include receiving the second and third signals from the second and third unsynchronized or loosely synchronized transmitters, respectively, using different respective frequencies and/or standards in a same frequency band, or using different respective frequency bands.

Moreover, the timing-error data may include first timing-error data, and the methods of operating a wireless user device may include receiving second and third timing-error data corresponding to the second and third unsynchronized or loosely synchronized transmitters, respectively, from the position network center. Determining the position location of the wireless user device may include determining the position location of the wireless user device, using the first, second, and third timing-error data corresponding to the first, second, and third unsynchronized or loosely synchronized transmitters. In some embodiments, determining the position location of the wireless user device may include virtually synchronizing the unsynchronized or loosely synchronized transmitter by using the timing-error data with the signal received from the unsynchronized or loosely synchronized transmitter.

In some embodiments, the signal received from the unsynchronized or loosely synchronized transmitter may include a signal that is received by a position network receiver from the unsynchronized or loosely synchronized transmitter. Moreover, receiving the signal may include receiving, from the unsynchronized or loosely synchronized transmitter, the signal that is received by the position network receiver from the unsynchronized or loosely synchronized transmitter.

DETAILED DESCRIPTION

Figure 1:
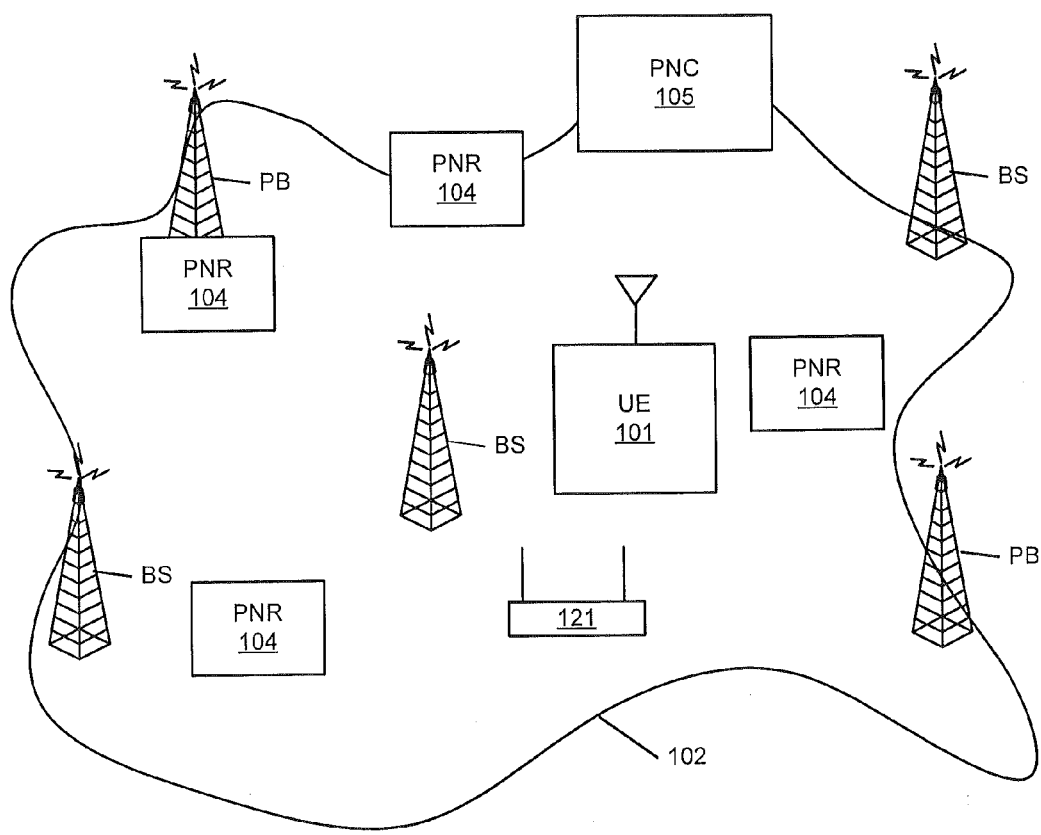
FIG. 1 is a schematic diagram illustrating a geographical area that includes unsynchronized and/or loosely synchronized transmitters, according to various embodiments described herein.

Example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete, and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled or responsive.

The terminology used herein is for the purpose of describing particular embodiments of the present inventive concepts only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

The present inventive concepts are described in part below with reference to flowcharts of operations and systems according to embodiments of the present inventive concepts. A given block or blocks of the flowcharts provides support for operations and/or systems.

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

The systems and operations described herein address how unsynchronized and/or loosely synchronized networks can be used for the determination of position location of a UE. The systems and operations may optionally be used in conjunction with synchronized networks such as Global Positioning System (GPS) networks and Terrestrial Beacon Networks (TBNs) that are designed to provide position location determinations in a given area. For example, GPS networks or TBNs may lack the coverage necessary to determine a position location. As an example, although three or more beacons (e.g., transmitters) may be needed to provide position location determinations in two-dimensional plane, only one or two beacons may be available under some circumstances. Under such circumstances, the unsynchronized and/or loosely synchronized networks may be used in conjunction with GPS networks and/or TBNs, using systems and operations described herein.

In various embodiments of the present inventive concepts, the systems and operations described herein may be used between networks operated by multiple service providers to enhance the accuracy of a position location determination. For example, a plurality of service providers may use LTE wireless communications in a given geographical area. Each service provider's network may individually be loosely synchronized, and there is typically no synchronization between networks operated by different network providers (inter-system synchronization). As described herein, synchronization with respect to time within a system may be referred to as "intra-system synchronization." On the other hand, synchronization with respect to time between different systems of the same type (e.g., different cellular systems) or different types (e.g., cellular and broadcast systems) may be referred to as "inter-system synchronization."

Even if a wireless communications system, such as an LTE network, is loosely synchronized, timing between different transmitters will drift. It may be desirable to correct such drift, as the drift may introduce significant errors in position location determinations. Accordingly, the systems and operations described herein may be used in various embodiments of the present inventive concepts to address the issue of timing drift between different transmitter sites.

Specifically, the systems and operations described herein may use timing error calculations to account for the timing drift of transmitters in unsynchronized or loosely synchronized networks when determining the position location of a UE. Accordingly, the systems and operations described herein may virtually synchronize unsynchronized or loosely synchronized networks to more precisely determine the position location of the UE.

Receiver Network

Existing wireless communications networks, such as some LTE or Wi-Fi networks or other types of networks, may be precisely synchronized and may thus provide a position location determination based on the time of signal arrival at a given UE. Other wireless communications networks (e.g., other LTE or Wi-Fi networks), however, may be unsynchronized or loosely synchronized. Various embodiments of the present inventive concepts may virtually synchronize wireless communications networks that are unsynchronized and/or loosely synchronized, to provide accurate position location determinations.

For example, receivers may be placed/installed in a geographical area of interest, to form a network within which the receivers are synchronized with respect to each other. The receivers may wirelessly receive signals that a UE is capable of receiving. (A TBN is one example of a network with receivers that can receive signals that a UE is capable of receiving.) Moreover, a network of receivers that derive their timing from a master network, such as GPS or some other common timing source, may be used to provide the systems and methods described herein. This can also be achieved where a highly-stable master source distributes time to receiver locations in a master-slave fashion. The network of receivers may determine the timing errors (i.e., lack of time synchronization) between different transmitters in a network or between transmitters in different networks (from which a UE can receive signals).

Additionally, it may be desirable to locate the receivers on relatively-high-elevation sites (which is typically the case for a TBN), whereby a line-of-sight path is provided between the network receivers and transmitters. This may help to provide a more precise calculation of timing errors between different transmitters.

Receiver Network Definitions

A Position Network Receiver (PNR) is a receiver that has (or has access to) precise (e.g., synchronized) timing with other PNRs and is capable of determining times of signal arrival from transmitters in networks that are unsynchronized or loosely synchronized. The PNR may additionally or alternatively be capable of determining distance ranging information associated with times of signal arrival from transmitters in networks that are unsynchronized or loosely synchronized. It will be understood that PNRs may measure transmitted signals and/or calculate timing (and/or ranging) errors continually/periodically to provide dynamic/updated virtual synchronization for unsynchronized or loosely synchronized transmitters.

A Position Network Center (PNC) is a server (or group of servers) that has data links to one or more PNRs in a PNR network. The server(s) can process the signals collected by a PNR from unsynchronized or loosely synchronized transmitters, to calculate timing (and/or ranging) errors. Alternatively, the server(s) can process receiver data from a PNR that has already calculated timing errors from various unsynchronized or loosely synchronized transmitters that are in its vicinity, or otherwise from unsynchronized or loosely synchronized transmitters from which a PNR can receive signals with sufficient signal strength to determine timing (and/or ranging) errors and send the timing (and/or ranging) errors to the server.

A PNR or PNC does not have to know the precise location of unsynchronized or loosely synchronized transmitters to calculate timing errors between the unsynchronized or loosely synchronized transmitters. For position location determination, however, a PNR or PNC may need to know (or be able to determine) the precise location of unsynchronized or loosely synchronized transmitters. Such precise locations can be identified/stored using a PNR, PNC, and/or UE.

Unsynchronized Transmitters (UTs) are transmitters whose signals are received by a PNR and a UE. UTs may include unsynchronized transmitters and/or loosely synchronized transmitters. As an example, UTs can belong to the same type of network (e.g., UTs can belong to an LTE network). Also, UTs can belong to networks that are of the same type but have different network operators. Moreover, UTs can belong to different types of networks that can be operated by the same operator or different operators. In various embodiments of the present inventive concepts, UTs may provide a UE with vast selection of transmitters to choose from to obtain improved results for position location determination. Additionally, the systems and operations described herein may provide virtual synchronization of UTs (within or between various networks described herein), to provide accurate position location determinations without further burdening (either physically or in terms of engineering) these networks of UTs.

Referring now to FIG. 1, a UE 101 is illustrated in a geographical area 102. The UE 101 may be (or may be a part of) one of various types of wireless electronic user devices and/or network elements (including mobile/cell phones, microcells, Voice Over Internet Protocol (VOIP) handsets, as well as wireless user devices without phone capabilities). The UE 101 can be located anywhere inside the geographical area 102. Although FIG. 1 illustrates a single UE 101, a plurality of UEs 101 may be located inside the geographical area 102. In some embodiments, hundreds, thousands, or more UEs 101 may be located inside the geographical area 102.

The UE 101 may wirelessly receive signals from a UT such as a Base Station (BS)(e.g., a cellular BS) and/or from a Positioning Beacon (PB) of a TBN. It will be understood that the geographical area 102 may include any number of (e.g., three, four, dozens, or more) BSs and/or PBs. Moreover, the UE 101 may optionally wirelessly receive signals from a Wi-Fi hot spot 121 in the geographical area 102.

Referring still to FIG. 1, the geographical area 102 may include one or more PNRs 104 and a PNC 105. The PNRs 104 may be geographically spaced apart from the BSs and/or PBs, or may be at or near the locations of the BSs and/or PBs (e.g., relatively-high-elevation sites). Although four PNRs 104 are illustrated in FIG. 1, it will be understood that the geographical area 102 may include any number of (e.g., one, two, dozens, or more) the PNRs 104. Moreover, it will be understood that a UT described herein may be one of the BSs illustrated in FIG. 1 and/or may be the Wi-Fi hot spot 121.

Determination of Timing Errors

A PNR 104 may frequently (e.g., every second) receive a signal from a given UT and calculate the time of transmission (e.g., the time elapsed between sending the signal from the UT and receiving the signal at the PNR 104). Because the location of both the UT (e.g., one of the BSs) and the PNR 104 is known and fixed, the PNR 104 can perform such a calculation based on the signal arrival time. Also, many signals (e.g., LTE signals) may include markers that are embedded by a UT, which may allow a UE to perform synchronization for a two-way communication between a given UE and UT. For example, a time database (e.g., a database of timing errors) can be created with respect to different UTs in a network, independently of UT locations, based on (e.g., using) the markers embedded in the signals.

Figure 2:
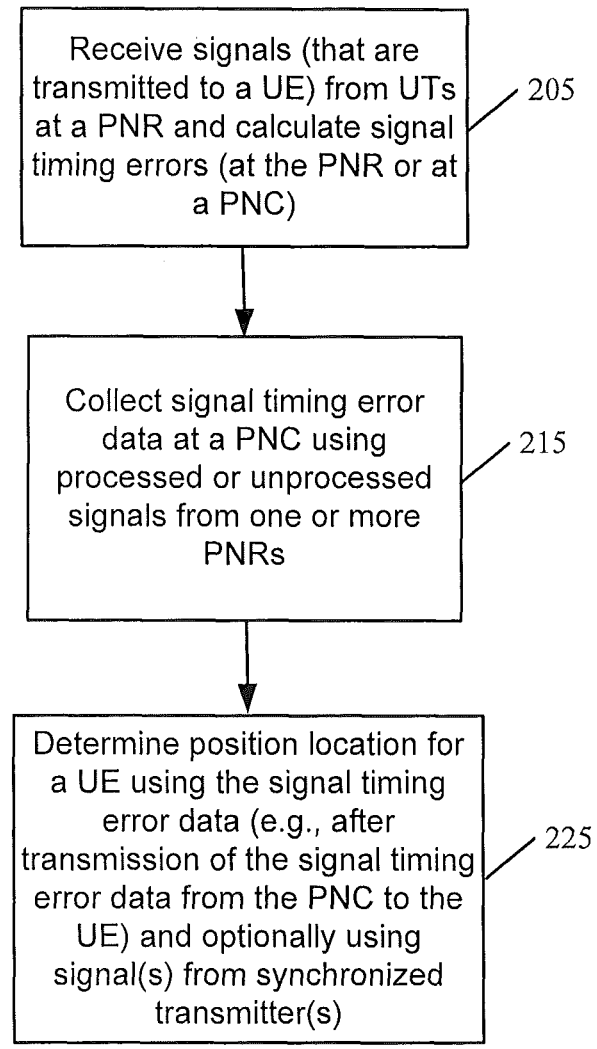
FIG. 2 is a flowchart illustrating operations of virtually synchronizing unsynchronized and/or loosely synchronized networks for position location determination, according to various embodiments described herein.

Referring to FIG. 2, a PNR 104 may calculate relative timing errors by performing the same transmission-time computation with respect to signals received from different UTs (e.g., different UTs from which the PNR 104 can receive signals in sufficient strength to calculate the elapsed time of signal transmission as described herein) (Block 205). If the unprocessed data/signals from the UTs are forwarded from the PNR 104 to the PNC 105, then the PNC 105 can perform the same calculation. Accordingly, in some embodiments, the calculation illustrated in Block 205 may occur in Block 215 at the PNC 105, after receiving the unprocessed data/signals at the PNC 105 from the PNR 104.

A PNC 105 may receive timing-error data from different PNRs 104 in a PNR network and may assemble a system-wide database of timing errors (Block 215). This data may be collected (e.g., every second at the PNRs 104) continually and may be used to correct any timing drift of the UTs.

Position location determinations can be performed for the UE 101 in various modes using the timing-error data to virtually synchronize UTs (Block 225). For example, a position location determination can be performed at the UE 101 if the timing-error data (with respect to signals transmitted by the UTs) is transmitted to the UE 101 via a network (e.g., a cellular network or a Wi-Fi network). In another example, a position location determination may be performed at the PNC 105 if the UE 101 forwards data/signals it receives from UTs to the PNC 105. As an example, the UE 101 can send time-of-arrival calculations, with respect to signals from UTs, to the PNC 105 or it can send unprocessed signals received from the UTs, which unprocessed signals can subsequently be processed at the PNC 105. After the PNC 105 performs the position location determination or timing correction for the UE 101, the position location determination or timing correction can be relayed back to the UE 101.

In a further example of a position location determination mode, the UE 101 can receive data/signals from a transmitter (e.g., one of the PBs illustrated in FIG. 1) associated with a TBN (and/or a GPS network) and may combine the received data/signals with timing-error-corrected data from the UTs to improve accuracy in position location determination. This can additionally or alternatively be performed at the PNC 105, which can combine TBN data and data from signals received by the UE 101 and responsively transmit a position location determination to the UE 101.

Further Processing of UT Signals

Figure 3:
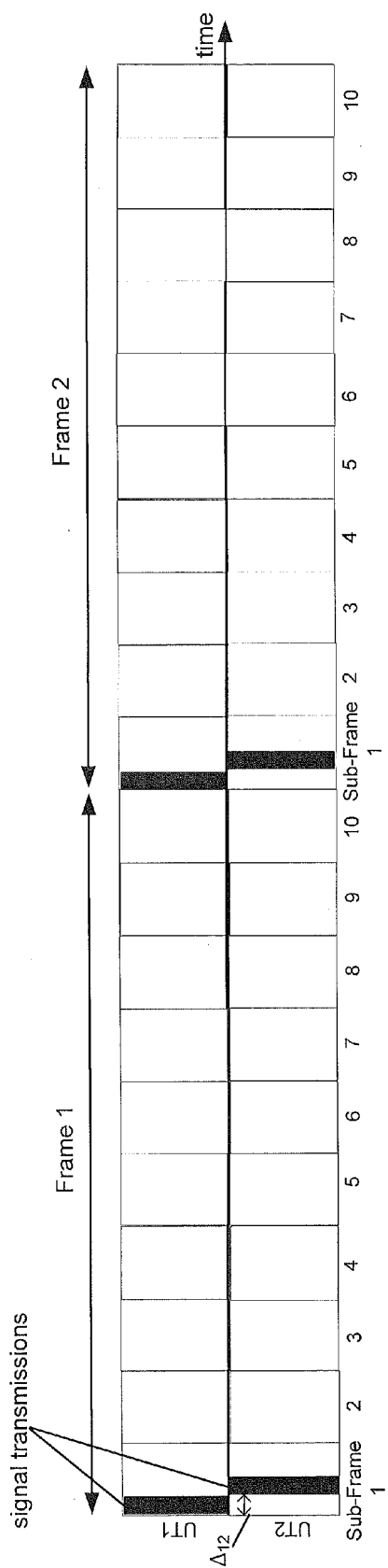
FIG. 3 is a diagram illustrating an LTE frame structure and a timing error between transmissions by unsynchronized or loosely synchronized transmitters, according to various embodiments described herein.

After timing errors (e.g., mismatch between different UT transmissions) are corrected, signals from UTs still need to be resolved. For example, FIG. 3 illustrates an LTE frame structure and further illustrates a timing error (e.g., the timing difference $\Delta_{12}$) between transmissions by a first UT (e.g., UT1) and second UT (e.g., UT2). The timing difference $\Delta_{12}$ may be measured by a PNR 104 and may be forwarded to the PNC 105, which can collect timing difference measurements with respect to all UTs in a network and can correct the timing mismatches. The UE 101, however, still needs to decode which frame it is in at the time of signal reception. In an LTE network, all UTs may transmit specific bits on the downlink to ensure that the UE 101 can perform a synchronization function with a given UT (e.g., a BS). If signals can be received within a frame (e.g., a frame may be ten (10) milliseconds long, and synchronization information may be sent twice per frame), then the signals can be processed without any frame (e.g., frame number) ambiguity. If, however, the UE 101 cannot perform this task within a frame, then additional processing may be needed.

Frame Ambiguity Resolution Using a TBN

For example, referring still to FIG. 3, in an LTE network, a frame may have a length of ten (10) milliseconds and each subframe may have a length of one (1) millisecond. A time slot may have length of one half (0.5) of a millisecond. This timing pattern may repeat itself. Accordingly, if a TBN network can locate the UE 101 within one frame with certainty, a search can be performed if a received signal (for synchronization) from a UT was within the same frame or needs to be corrected for frame misalignment (rather than timing) of received signals by the UE 101.

Frame Ambiguity Resolution Using a PNC

To ensure that all received signals from the UTs belong to the same frame (at different UTs), the UE 101 can simply collect the received signals and post-processing can be performed at the PNC 105. If the signals do not belong to the same frame, then the PNC 105 can make an adjustment by the number of frames by search or frame identifier.

Using a Plurality of Frequencies, Bands, and/or Standards

Near-far problems may result from frequency reuse in wireless communications networks such as LTE networks. In various embodiments of the present inventive concepts, however, (i) a plurality of frequencies, (ii) a plurality of frequency bands, and/or (iii) a plurality of standards may be used to improve accuracy and reduce/overcome near-far issues.

Accuracy (e.g., position location determination accuracy) may be improved by increasing the number of arrival angles of signals. For example, allowing a device (e.g., the UE 101) to receive signals from all potential transmitting sites (instead of just those associated with the currently-used carrier and standard) increases the number of reference sites that can be heard and used for triangulation.

Furthermore, the device may sometimes be close to a cell providing service. For example, the UE 101 may be close to a particular BS in FIG. 1. In a single-frequency network, such as a CDMA or LTE network, transmissions by the close-by cell (e.g., BS) may be strong enough to block detection of surrounding sites (e.g., different UTs) operating on the same frequency (which is a classic near-far issue in radio communications). This blocking may be reduced/overcome by receiving multiple frequencies and/or standards in the same band, or by receiving different bands, as these frequencies would not be co-channel and therefore would not be blocked by the strong signal being received on the device's current operating frequency.

A variety of different embodiments of the present inventive concepts have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present inventive concepts described herein, and of the manner and process of making and using them, and shall support claims to any such combination or subcombination.

In the drawings and specification, there have been disclosed example embodiments of the present inventive concepts. Although specific terms are employed, they are used in a generic and descriptive sense only and not for purposes of limitation, the scope of the present inventive concepts being defined by the following claims.

What is claimed is:

1. A method of operating a position network center comprising at least one server, the method comprising:
   receiving, at the position network center, timing-error data corresponding to a plurality of unsynchronized or loosely synchronized cellular or Wi-Fi transmitters, from at least one position network receiver; and
   transmitting, from the position network center, data that indicates a plurality of timing errors by the plurality of unsynchronized or loosely synchronized cellular or Wi-Fi transmitters and corresponds to a lack of synchronization between different networks, to a wireless user device that receives signals from the plurality of unsynchronized or loosely synchronized cellular or Wi-Fi transmitters, after receiving the timing-error data from the at least one position network receiver at the position network center.

2. The method of claim 1,
   wherein first and second ones of the plurality of unsynchronized or loosely synchronized transmitters are associated with cellular wireless networks operated by different cellular service providers, respectively, and
   wherein transmitting the data that indicates the plurality of timing errors comprises:
   transmitting data that indicates a plurality of timing errors corresponding to the first and second ones of the plurality of unsynchronized or loosely synchronized transmitters to the wireless user device that receives signals from the first and second ones of the plurality of unsynchronized or loosely synchronized transmitters that are associated with the cellular wireless networks operated by the different cellular service providers, respectively.

3. The method of claim 1,
   wherein first and second ones of the plurality of unsynchronized or loosely synchronized transmitters are associated with different sites in a cellular wireless network operated by a single service provider, and
   wherein transmitting the data that indicates the plurality of timing errors comprises:
   transmitting data that indicates a plurality of timing errors corresponding to the first and second ones of the plurality of unsynchronized or loosely synchronized transmitters to the wireless user device that receives signals from the first and second ones of the plurality of unsynchronized or loosely synchronized transmitters that are associated with the different sites in the cellular wireless network operated by the single service provider.

4. The method of claim 1,
   wherein the at least one position network receiver is synchronized with other position network receivers, and
   wherein receiving the timing-error data comprises:
   receiving the timing-error data corresponding to the plurality of unsynchronized or loosely synchronized cellular or Wi-Fi transmitters from the at least one position network receiver that is synchronized with the other position network receivers.

5. The method of claim 1,
   wherein the timing-error data indicates the plurality of timing errors, by the plurality of unsynchronized or loosely synchronized cellular or Wi-Fi transmitters, and
   wherein receiving the timing-error data comprises:
   receiving the timing-error data that indicates the plurality of timing errors, by the plurality of unsynchronized or loosely synchronized cellular or Wi-Fi transmitters, from the at least one position network receiver.

6. The method of claim 1,
   wherein the timing-error data comprises signals that were transmitted by the plurality of unsynchronized or loosely synchronized cellular or Wi-Fi transmitters, and forwarded from the at least one position network receiver to the position network center, with the plurality of timing errors, and
   wherein the method further comprises:
   calculating the plurality of timing errors using the signals that were transmitted by the plurality of unsynchronized or loosely synchronized cellular or Wi-Fi transmitters and forwarded to the position network center from the at least one position network receiver.

7. The method of claim 6, wherein calculating the plurality of timing errors comprises:
calculating the plurality of timing errors at the position network center irrespective of precise locations of the plurality of unsynchronized or loosely synchronized cellular or Wi-Fi transmitters.

8. The method of claim 1, further comprising performing a correction of timing drift of the plurality of unsynchronized or loosely synchronized cellular or Wi-Fi transmitters by using the data that indicates the plurality of timing errors with respective ones of the signals from the plurality of unsynchronized or loosely synchronized cellular or Wi-Fi transmitters.

9. A method of operating a position network center comprising at least one server, the method comprising:
receiving, at the position network center, timing-error data corresponding to a plurality of unsynchronized or loosely synchronized transmitters, from at least one position network receiver;
transmitting, from the position network center, data that indicates a plurality of timing errors by the plurality of unsynchronized or loosely synchronized transmitters, to a wireless user device that receives signals from the plurality of unsynchronized or loosely synchronized transmitters, after receiving the timing-error data from the at least one position network receiver at the position network center; and
performing a frame adjustment in response to determining that the signals from the plurality of unsynchronized or loosely synchronized transmitters do not belong to a same frame.

10. A method of operating a position network receiver, the method comprising:
receiving signals from a plurality of unsynchronized or loosely synchronized cellular or Wi-Fi transmitters;
calculating timing errors corresponding to the plurality of unsynchronized or loosely synchronized cellular or Wi-Fi transmitters; and
transmitting timing-error data that indicates the timing errors and corresponds to a lack of synchronization between different networks, to a position network center comprising at least one server.

11. The method of claim 10,
wherein first and second ones of the plurality of unsynchronized or loosely synchronized transmitters are associated with cellular wireless networks operated by different cellular service providers, respectively, and
wherein receiving the signals comprises:
receiving signals from the first and second ones of the plurality of unsynchronized or loosely synchronized transmitters that are associated with the cellular wireless networks operated by the different cellular service providers, respectively.

12. The method of claim 10,
wherein first and second ones of the plurality of unsynchronized or loosely synchronized transmitters are associated with different sites in a cellular wireless network operated by a single service provider, and
wherein receiving the signals comprises:
receiving signals from the first and second ones of the plurality of unsynchronized or loosely synchronized transmitters that are associated with the different sites in the cellular wireless network operated by the single service provider.

13. The method of claim 10,
wherein the position network receiver is synchronized with other position network receivers, and
wherein receiving the signals comprises:
receiving the signals from the plurality of unsynchronized or loosely synchronized cellular or Wi-Fi transmitters, at the position network receiver that is synchronized with the other position network receivers.

14. The method of claim 10,
wherein the signals received from the plurality of unsynchronized or loosely synchronized cellular or Wi-Fi transmitters comprise signals that are transmitted by the plurality of unsynchronized or loosely synchronized cellular or Wi-Fi transmitters to a wireless user device, and
wherein receiving the signals comprises:
receiving, from the plurality of unsynchronized or loosely synchronized cellular or Wi-Fi transmitters, the signals that are transmitted by the plurality of unsynchronized or loosely synchronized cellular or Wi-Fi transmitters to the wireless user device.

15. The method of claim 14, wherein receiving the signals comprises:
continually or periodically receiving, from the plurality of unsynchronized or loosely synchronized cellular or Wi-Fi transmitters, signals that are transmitted by the plurality of unsynchronized or loosely synchronized cellular or Wi-Fi transmitters to the wireless user device.

16. The method of claim 14, wherein transmitting the timing-error data comprises:
transmitting the timing-error data to the position network center for compensation of the timing errors, to assist with position location determination of the wireless user device.

17. A method of operating a wireless user device, the method comprising:
receiving a signal from an unsynchronized or loosely synchronized cellular or Wi-Fi transmitter;
receiving a signal from at least one terrestrial positioning beacon of a synchronized terrestrial beacon network;
receiving timing-error data corresponding to the unsynchronized or loosely synchronized cellular or Wi-Fi transmitter, from a position network center comprising at least one server; and
determining a position location of the wireless user device, by combining timing-error-corrected data corresponding to the unsynchronized or loosely synchronized cellular or Wi-Fi transmitter with the signal from the at least one terrestrial positioning beacon of the synchronized terrestrial beacon network.

18. The method of claim 17,
wherein receiving the signal from the unsynchronized or loosely synchronized cellular or Wi-Fi transmitter comprises receiving a first signal from a first unsynchronized or loosely synchronized cellular or Wi-Fi transmitter,
wherein the method further comprises receiving second and third signals from second and third unsynchronized or loosely synchronized cellular or Wi-Fi transmitters, respectively,
wherein the timing-error data comprises first timing-error data,
wherein the method further comprises receiving second and third timing-error data corresponding to the second and third unsynchronized or loosely synchronized cellular or Wi-Fi transmitters, respectively, from the position network center, and wherein determining the position location of the wireless user device comprises determining the position location of the wireless user device, using the first, second, and third timing-error data corresponding to the first, second, and third unsynchronized or loosely synchronized cellular or Wi-Fi transmitters.

19. The method of claim 18, wherein receiving the second and third signals comprises:

receiving the second and third signals from the second and third unsynchronized or loosely synchronized cellular or Wi-Fi transmitters, respectively, using different respective:

frequencies, and/or standards, in a same frequency band; or frequency bands.

20. The method of claim 17, wherein the signal received from the unsynchronized or loosely synchronized cellular or Wi-Fi transmitter comprises a signal that is received by a position network receiver from the unsynchronized or loosely synchronized cellular or Wi-Fi transmitter, and wherein receiving the signal comprises:

receiving, from the unsynchronized or loosely synchronized cellular or Wi-Fi transmitter, the signal that is received by the position network receiver from the unsynchronized or loosely synchronized cellular or Wi-Fi transmitter.

21. The method of claim 17, wherein determining the position location of the wireless user device comprises:

combining the timing-error-corrected data with the signal received from the unsynchronized or loosely synchronized cellular or Wi-Fi transmitter.

22. The, method of claim 17, wherein:

receiving the signal comprises receiving a first signal from a first unsynchronized or loosely synchronized cellular or Wi-Fi transmitter of a first network;

the method further comprises receiving a second signal from a second unsynchronized or loosely synchronized cellular or Wi-Fi transmitter of a second network that is different from the first network;

receiving the timing-error data comprises receiving, at the wireless user device, timing-error data corresponding to a lack of synchronization between the first unsynchronized or loosely synchronized cellular or Wi-Fi transmitter of the first network and the second unsynchronized or loosely synchronized cellular or Wi-Fi transmitter of the second network that is different from the first network, from the position network center; and determining the position location comprises determining the position location of the wireless user device, using the timing-error data and using the second signal from the second unsynchronized or loosely synchronized cellular or Wi-Fi transmitter of the second network that is different from the first network.

* * * * *